United States Patent
Strang

(10) Patent No.: US 10,602,897 B2
(45) Date of Patent: Mar. 31, 2020

(54) METHOD FOR OPERATING AN INDEPENDENTLY MOVING SURFACE TREATMENT DEVICE

(71) Applicant: Vorwerk & Co. Interholding GmbH, Wuppertal (DE)

(72) Inventor: Benjamin Strang, Solingen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 16/323,895

(22) PCT Filed: Jul. 20, 2017

(86) PCT No.: PCT/EP2017/068392
§ 371 (c)(1),
(2) Date: Feb. 7, 2019

(87) PCT Pub. No.: WO2018/028968
PCT Pub. Date: Feb. 15, 2018

(65) Prior Publication Data
US 2019/0174987 A1    Jun. 13, 2019

(30) Foreign Application Priority Data

Aug. 8, 2016    (DE) .................. 10 2016 114 628

(51) Int. Cl.
*A47L 9/28*    (2006.01)
*G05D 1/00*    (2006.01)
*G05D 1/02*    (2020.01)

(52) U.S. Cl.
CPC .......... *A47L 9/2805* (2013.01); *A47L 9/2857* (2013.01); *G05D 1/0044* (2013.01);
(Continued)

(58) Field of Classification Search
CPC .... A47L 9/2805; A47L 9/2857; A47L 9/0411; A47L 11/24; B25J 9/1666; B25J 11/0085;
(Continued)

(56) References Cited

U.S. PATENT DOCUMENTS 9,375,119 B2 *    6/2016    Lee .................. G05D 1/0255
9,984,558 B2 *    5/2018    Artes ................ G05D 1/0274
(Continued)

FOREIGN PATENT DOCUMENTS

EP    2 423 893 A1    2/2012
EP    2 423 893 B1    4/2013

OTHER PUBLICATIONS

International Search Report of PCT/EP2017/068392, dated Nov. 6, 2017.

*Primary Examiner* — Hung T Nguyen
(74) *Attorney, Agent, or Firm* — Collard & Roe, P.C.

(57) ABSTRACT

A method for operating an independently moving surface treatment device, wherein the surface treatment device can be displaced in the surroundings and, in the process, performs surface treatment tasks and wherein an obstacle detection device of the surface treatment device measures an obstacle within the surroundings. The surface treatment device remains motionless at a predefined location, in particular within a movement range of a certain object, in the surroundings during a time interval that was predefined by the user. The obstacle detection device repeatedly measures a distance to a certain object during the time interval and evaluates the measured values of the distance in respect of a temporal change, and/or wherein the obstacle detection device detects a possibly occurring collision with the object during the time interval, wherein an alarm signal is output in the case of a change beyond a predefined threshold and/or in the case of a collision.

10 Claims, 4 Drawing Sheets

(52) U.S. Cl.
CPC ........ *G05D 1/0274* (2013.01); *A47L 2201/04* (2013.01); *G05D 2201/0203* (2013.01)

(58) Field of Classification Search
CPC ... B25J 9/1694; G05D 1/0044; G05D 1/0274; G05D 1/0255
USPC ............... 340/435, 436, 467, 539.23, 541; 342/385, 417; 700/245; 701/23
See application file for complete search history.

(56) References Cited

U.S. PATENT DOCUMENTS

| | | | |
|---|---|---|---|
| 2005/0166354 A1* | 8/2005 | Uehigashi | A47L 9/2805 15/319 |
| 2007/0244610 A1* | 10/2007 | Ozick | A47L 9/0411 701/23 |
| 2013/0232717 A1 | 9/2013 | Lee et al. | |
| 2015/0170509 A1 | 6/2015 | Artes et al. | |

* cited by examiner

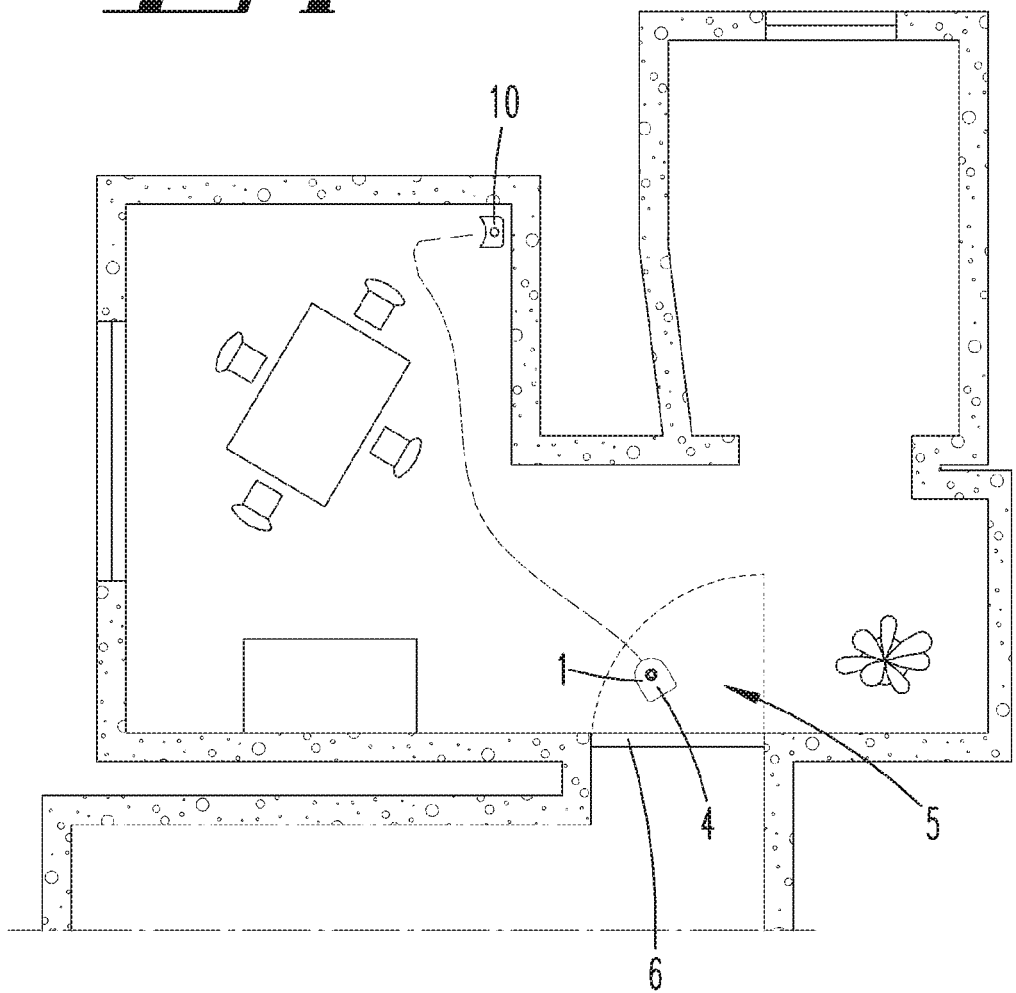
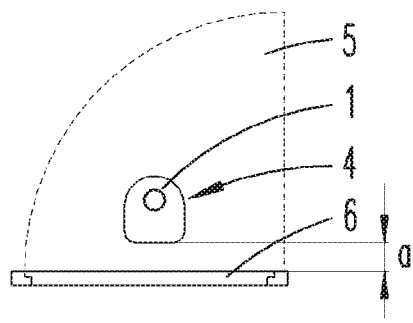
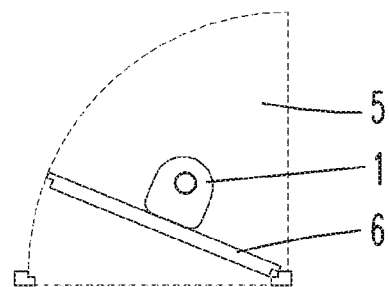

METHOD FOR OPERATING AN INDEPENDENTLY MOVING SURFACE TREATMENT DEVICE

CROSS REFERENCE TO RELATED APPLICATIONS

This application is the National Stage of PCT/EP2017/068392 filed on Jul. 20, 2017, which claims priority under 35 U.S.C. § 119 of German Application No. 10 2016 114 628.5 filed on Aug. 8, 2016, the disclosures of which are incorporated by reference. The international application under PCT article 21(2) was not published in English.

TECHNICAL FIELD

The invention pertains to a method for operating an independently moving surface treatment device, particularly a cleaning robot, wherein the surface treatment device can travel in an environment and in the process perform surface treatment tasks where necessary, and wherein an obstacle detection device of the surface treatment device measures an obstacle within the environment.

The invention also pertains to an independently moving surface treatment device, particularly a cleaning robot, which can travel in an environment and in the process perform surface treatment tasks where necessary, wherein said surface treatment device comprises an obstacle detection device for measuring an obstacle within the environment and a control unit.

The invention also pertains to a set consisting of such an independently moving surface treatment device and an external device, which is communicatively linked to the surface treatment device and comprises a display for displaying an environment map of the surface treatment device.

The invention furthermore pertains to a computer program product for being installed on an independently moving surface treatment device and/or on an external device, which is communicatively linked to the surface treatment device, wherein the computer program product is designed for controlling the surface treatment device.

PRIOR ART

Methods for operating such a surface treatment device are known from the prior art. In this case, the surface treatment device can travel back and forth within a room and/or multiple rooms of a residence, for example based on a self-generated and stored environment map, and preferably perform cleaning tasks such as vacuuming and/or mopping. It is likewise known to additionally equip such surface treatment devices with other functions, for example monitoring a room with respect to the unauthorized entry of a person.

For example, publication EP 2 423 893 B1 discloses an independently moving cleaning device that detects objects by means of a sensor system, wherein one or more environmental characteristics are measured at least in a certain defined time period and an alarm is triggered in case of a change in the arrangement of an object or an unauthorized entry of a person. The change in the arrangement of an object and/or the presence of a new object or a person is respectively detected with a distance measuring device and/or with an obstacle sensor by comparing a stored reference map of the room with current measured values.

SUMMARY OF THE INVENTION

Based on the aforementioned prior art, the invention aims to disclose an alternative way for detecting the unauthorized entry of a person, particularly a burglary, within an environment of the surface treatment device, particularly without the aid of a stored environment map of the surface treatment device.

In order to attain the above-defined objective, the invention proposes a method for operating an independently moving surface treatment device, in which the surface treatment device remains motionless at a defined location of the environment, particularly in a range of motion of a certain object, during a user-predefined time span, wherein the obstacle detection device repeatedly measures a distance to a certain object and evaluates the measured values of the distance with respect to a time rate of change during the time span and/or wherein the obstacle detection device detects a potentially occurring collision with the object during the time span, and wherein an alarm signal is output in case of a change beyond a defined threshold value and/or in case of a collision.

According to the invention, the obstacle detection device of the surface treatment device is used for detecting a motion of the monitored object during a time span, in which the surface treatment device does not move or change its orientation. According to the invention, this may either be realized by successively measuring a distance to the object or alternatively by detecting a collision with the object. In the first case, the obstacle detection device of the surface treatment device is realized in the form of a distance measuring device, for example a laser triangulation measuring device, an ultrasonic sensor or the like. In the second case, the obstacle detection device is realized in the form of a sensor that can directly or indirectly detect a contact between the object and the surface treatment device. In contrast to the prior art, no comparison with an environment map of the surface treatment device is required in both alternative embodiments of the invention. In fact, distances measured during the time span are either compared with one another, wherein a potentially occurring change indicates a motion of the object relative to the surface treatment device, and/or a collision of the surface treatment device with the object is detected as absolute result. A distance change or a contact with the object then respectively leads to the detection of a motion, whereupon an evaluation and control unit of the surface treatment device can trigger an alarm signal.

According to the invention, the obstacle detection device therefore is not or not only used for detecting obstacles while the surface treatment apparatus travels within the environment, for example in order to perform a cleaning cycle, but rather also for monitoring the environment with respect to a burglary that is associated with a motion of the monitored object, for example a motion of a movable window sash or a movable door leaf, which a burglar would have to move in order to respectively access the monitored residence or the monitored room.

According to the invention, the obstacle detection device therefore also serves as an intrusion detection sensor. Advantageously, the surface treatment device is no longer dependent on the generation of an environment map of a room or a residence in order to monitor the environment.

It is proposed that a user of the surface treatment device selects the object in an environment map displayed on a display of the surface treatment device and/or on a display of an external device, which is communicatively linked to the surface treatment device. The user can conveniently select the deployment site of the surface treatment device for monitoring the room and the object to be monitored on the display of the surface treatment device or of the external device, respectively. In this case, the graphic display of the environment map and, in particular, the simultaneous display of the current position of the surface treatment device within the environment map allow an unproblematic orientation of the user and therefore a quick and absolutely certain selection of the object to be monitored by the surface treatment device. For example, the environment map may represent a floor plan of a residence, in which the surface treatment device is normally used for performing cleaning tasks or the like. The user may select, for example, the region of an entrance door to the residence or the room in the environment map. For example, the user marks the object to be monitored by selecting the object within the environment map and a monitoring function can thereby be started simultaneously or, if applicable, with a time delay. The display may either be an individual display of the surface treatment device or a display of an external device linked to the surface treatment device, for example a mobile telephone, a tablet PC, a laptop and the like. If the surface treatment device is communicatively linked to such an external device, the user does not have to be present in the environment of the surface treatment device in order to start a monitoring function. In fact, the user can also select an object to be monitored on the display of the external device and start a monitoring function externally, e.g. via a mobile telephone connection.

It is furthermore proposed that the surface treatment device is respectively moved to the defined location or into the range of motion of the certain object in dependence on the previous selection by means of a control unit of the surface treatment device and/or of the external device, and that the surface treatment device assumes a position and/or orientation, which allows an obstacle detection on the certain object. According to this embodiment, a control command for moving the surface treatment device to the selected location is generated in dependence on the previous selection. The control command may either be generated by the external device or by an evaluation and control unit of the surface treatment device. In connection with an external device, it would also be conceivable that the external device merely transmits information on the selected location to an evaluation and control unit of the surface treatment device and the evaluation and control unit generates the control command in dependence on this information. The control command not only serves for moving the surface treatment device to the selected location, but rather also for positioning the surface treatment device at this location in such a way that an obstacle detection on the selected object can be realized. This may require a certain orientation of the surface treatment device relative to the object and/or a certain distance from the object, for example an arrangement of the surface treatment device within a normal range of motion of the certain object. For example, a range of motion may be a pivoting range of a door leaf or a window sash. During the time span defined for the monitoring task, the surface treatment device parks in such a way that the obstacle detection device can optimally detect a motion of the object to be monitored.

It is furthermore proposed that a measured change of the distance beyond the threshold value or a detected collision respectively implies a motion of the object and results in the output of the alarm signal. The defined threshold value specifies that a measured distance deviation beyond this threshold value is interpreted as a motion of the object. For example, the threshold value may amount to a few millimeters such as 10 mm, but also to several centimeters. An attempted burglary is normally associated with a motion or displacement of the monitored object, for example a pivoting motion of a door leaf or window sash. A surface treatment device positioned in the region of the object, particularly within the range of motion of the object, can measure the changing distance to the object or comes in direct contact with the moving object. A distance change or contact with the object then respectively leads to the detection of a motion, whereupon an evaluation and control unit of the surface treatment device can trigger an alarm signal. In this case, the alarm signal may either be emitted by the surface treatment device itself or by the external device, which is communicatively linked to the surface treatment device, or even by a house alarm system that communicates with the surface treatment device. The alarm signal may be an acoustic signal, an optical signal or even a haptic signal (vibration signal).

It is furthermore proposed that a collision is detected by means of a contact sensor, an acceleration sensor, a capacitive sensor and/or an odometric sensor. A collision between the surface treatment device and the object can therefore be detected with sensors that are designed and function in different ways. For example, a contact sensor may be arranged in the region of a bumper of the surface treatment device and realized, in particular, in the form of a pushbutton that is actuated in case of a collision, i.e. contact, with the monitored object. An acceleration sensor can measure an amount and a direction of a motion of the surface treatment device, which likewise implies contact with the monitored object. It would furthermore be possible to use the odometric sensor that is usually provided on the surface treatment device anyway and respectively monitors a rotation of a wheel of the surface treatment device or a resulting induced motor voltage, which indicates a motion of the surface treatment device and therefore also a collision with the monitored object. If applicable, capacitive sensors are also suitable for this purpose. All these proposed sensors have the advantage that they respectively require little or no energy. Consequently, the corresponding measuring methods are superior to a distance measurement, for example, by means of laser triangulation.

It is also proposed that the surface treatment device switches into a standby mode after it reaches the defined location and is awakened by a collision with the object. According to this embodiment, the surface treatment device switches into a standby mode after it reaches the location selected in the environment map. The surface treatment device can be awakened from this standby mode by a potential collision. The standby mode is realized in such a way that the surface treatment device can remain in this standby mode and perform the monitoring function for several days, for example, without having to travel to a base station in order to charge an accumulator. If applicable, the standby mode can also be interrupted by drives to the base station, for example with a timer function. In any case, a collision of the surface treatment device with the monitored object causes the surface treatment device to be awakened from the standby mode and, if applicable, the subsequent output or triggering of an alarm signal. Advantageously, a timer or a real-time clock also operates in the standby mode. Accordingly, the standby mode can be terminated, for example, after the expiration of a predefined time span that limits the maximum standby period of the surface treatment device in order to enable the surface treatment device to travel to a base station. As an alternative to a timer or a real-time clock of the surface treatment device, the external device may also perform a corresponding timer function, for example by transmitting a wake-up command to the surface treatment device via a WLAN connection, whereupon the surface treatment device is awakened from the standby mode.

In addition to the above-described method for operating an independently moving surface treatment device, the invention also proposes an independently moving surface treatment device, particularly a cleaning robot, which can travel in an environment and in the process perform surface treatment tasks where necessary, wherein said surface treatment device comprises an obstacle detection device for measuring an obstacle within the environment and a control unit, wherein the control unit is designed for positioning the surface treatment device motionlessly at a defined location of the environment, particularly in a range of motion of a certain object, during a user-predefined time span, and wherein the obstacle detection device is designed for repeatedly measuring a distance to the certain object and evaluating the measured values of the distance with respect to a time rate of change during the time span and/or for detecting a potentially occurring collision with the object during the time span, as well as for outputting an alarm signal in case of a change beyond a defined threshold value and/or in case of a collision. The proposed surface treatment device may furthermore be designed for carrying out the above-described method, which particularly includes all characteristics described above with reference to the method.

The invention also proposes a set consisting of such an independently moving surface treatment device and an external device, which is communicatively linked to the surface treatment device and comprises a display for displaying an environment map of the surface treatment device, wherein the external device is designed for allowing the selection of a defined location within an environment map displayed on the display and for transmitting information on the selection to the surface treatment device, and wherein the surface treatment device is designed for moving to the defined location in dependence on the selection and assuming an orientation, which allows a measurement on a certain object, as well as for remaining at the defined location motionlessly during a user-predefined time span. In this case, the independently moving surface treatment device is an inventive surface treatment device of the above-described type. Accordingly, the characteristics and advantages described with reference to the surface treatment device also apply to the inventive set.

The invention ultimately also proposes a computer program product for being installed on an independently moving surface treatment device and/or on an external device, which is communicatively linked to the surface treatment device, wherein the computer program product is designed for controlling the surface treatment device, and wherein the computer program product comprises: a program step for displaying an environment map of the surface treatment device on a display of the surface treatment device and/or on a display of the external device, a program step for selecting a location to be monitored within the environment map, a program step for moving the surface treatment device to the selected location, particularly into a range of motion of a certain object, a program step for motionlessly positioning the surface treatment device at the location during a defined time span, and a program step for controlling an obstacle detection device of the surface treatment device to repeatedly measure a distance to the certain object and evaluate the measured distances with respect to a time rate of change and/or to detect a potentially occurring collision with the object. In this case, the computer program product may particularly be designed for carrying out the above-described method. The computer program product advantageously is an application, which is either installed on the surface treatment device itself or on an external device, for example a mobile telephone, a laptop, a tablet PC and the like.

BRIEF DESCRIPTION OF THE DRAWINGS

The invention is described in greater detail below with reference to exemplary embodiments. In the drawings:

FIG. 4 shows the surface treatment device as it moves into the range of motion of an object to be monitored, FIG. 5 shows the surface treatment device within the range of motion of the object to be monitored, and FIG. 6 shows the surface treatment device according to FIG. 5 during a motion of the object to be monitored.

DESCRIPTION OF THE EMBODIMENTS

Figure 1:
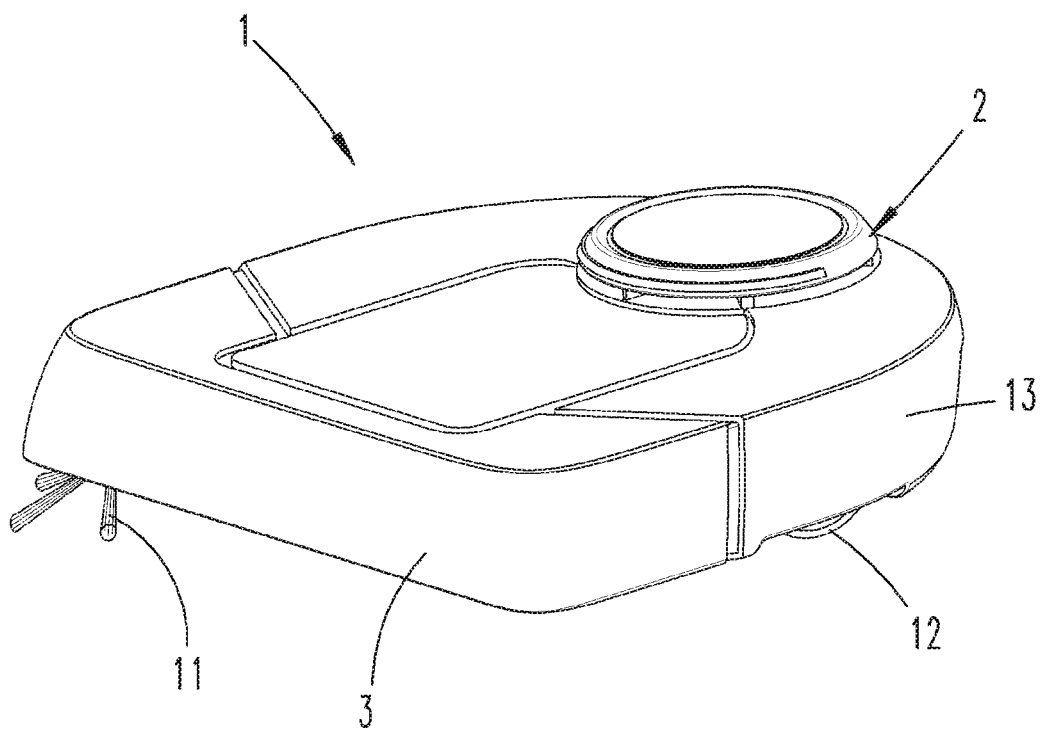
FIG. 1 shows an inventive surface treatment device.

FIG. 1 shows an inventive surface treatment device 1, which in this case is realized in the form of an independently moving vacuuming robot. The surface treatment device 1 is equipped with wheels 12, of which only one is visible in this illustration, wherein said wheels serve for independently moving the surface treatment device 1 in combination with a drive. The surface treatment device 1 furthermore comprises a brush 11 for acting upon a surface to be cleaned. The surface treatment device 1 comprises two obstacle detection devices 2, 3, wherein the first obstacle detection device 2 is a laser triangulation device and the second obstacle detection device 3 is a contact sensor, which is realized in the form of a pushbutton and forms a section of a device housing 13 of the surface treatment device 1.

The obstacle detection devices 2, 3 serve for detecting objects 6 that represent obstacles, for example walls, pieces of furniture and the like, during a normal cleaning cycle of the surface treatment device 1. This allows an orientation of the surface treatment device 1 within the environment, as well as the generation of an environment map 9 of the surface treatment device 1, which the surface treatment device 1 accesses during its independent navigation. In this case, the obstacle detection device 2 in the form of a laser triangulation device can measure objects 6 over an angular range of 360 degrees around the surface treatment device 1. A (not-shown) evaluation and control unit is assigned to the obstacle detection device 2 and can evaluate the measured values detected by the obstacle detection device 2. The obstacle detection device 2 is designed for the contactless measurement of objects 6. In this case, the objects 6 can be detected within distances between a few millimeters and several meters. The obstacle detection device 3 in the form of a contact sensor detects the existence of an object 6 due to direct contact with the object 6 to be measured.

Figure 3:
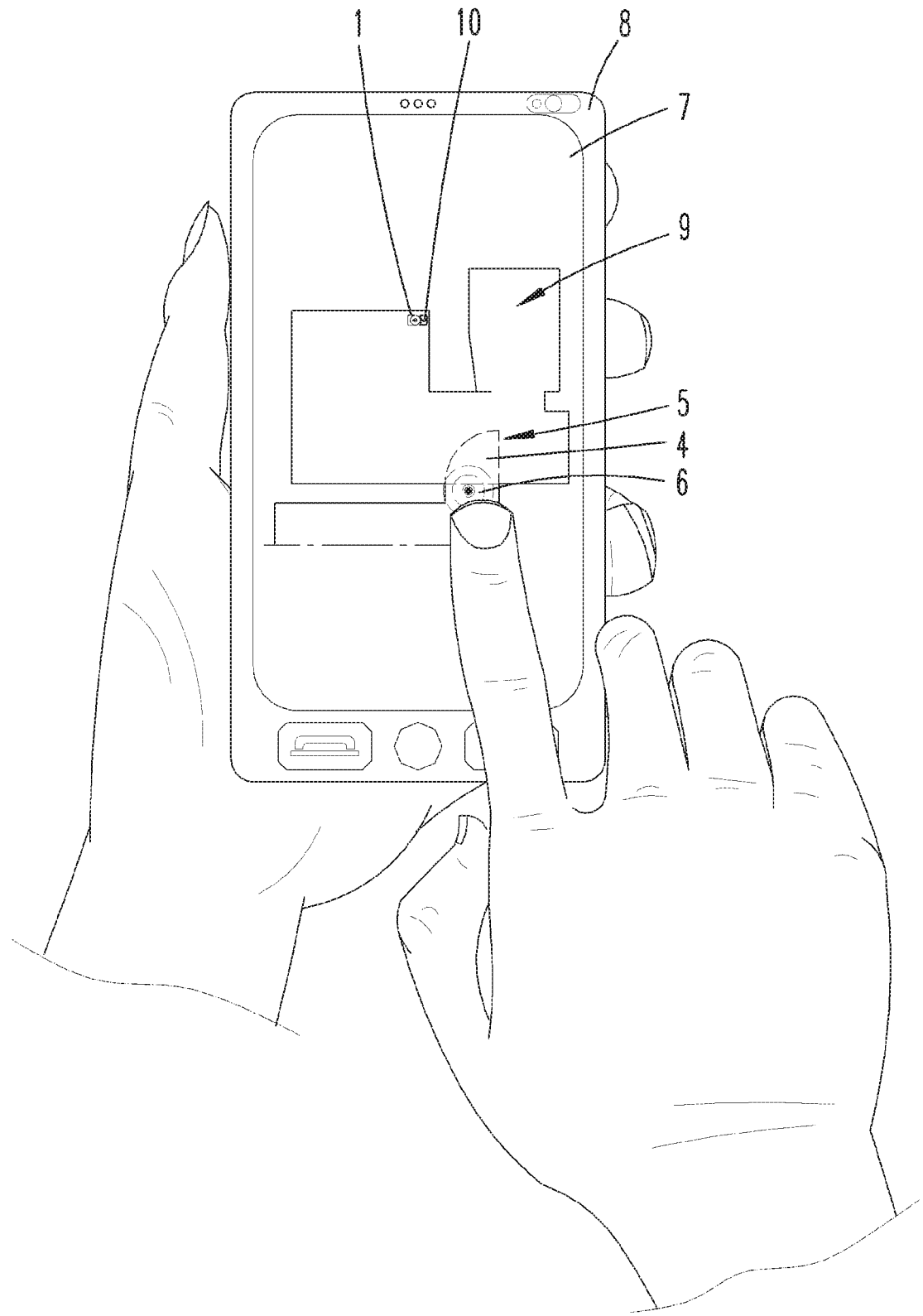
FIG. 3 shows an external device with a display, on which an environment map is displayed.

The surface treatment device 1 is also equipped with a communication module, for example a WLAN module, by means of which the surface treatment device 1 can communicate with an external device 8 such as a mobile telephone (see FIG. 3).

Figure 2:
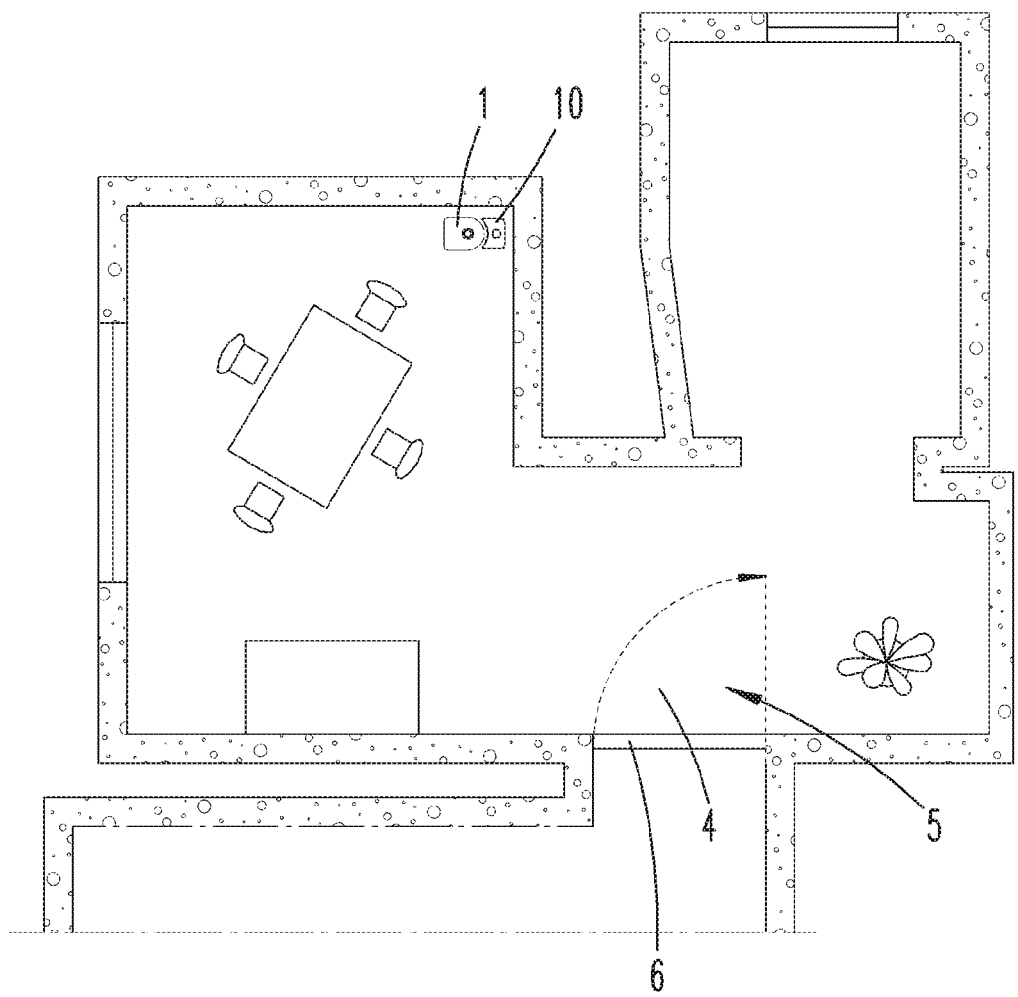
FIG. 2 shows an environment of the surface treatment device.

FIG. 2 shows part of a residence with multiple rooms that contain movable objects 6, which in this example include a door leaf. A surface treatment device 1 is located in one of the rooms. In this case, the surface treatment device 1 is arranged at a base station 10, for example, in order to charge an accumulator.

The exemplary object 6 in the form of a pivotable door leaf has a range of motion 5 that corresponds to the pivoting range of the door leaf. A location 4 is defined within this range of motion 5. This location 4 can basically be selected anywhere within the range of motion 5.

FIG. 3 shows an external device 8, which in this case is realized in the form of a mobile telephone. The external device 8 has a display 7, which in this case is realized in the form of a touchscreen. An environment map 9 corresponding to the room situation illustrated in FIG. 2 is displayed on the display 7. The current position of the surface treatment device 1 and the base station 10 are illustrated in the environment map 9. A user of the external device 8 can select (click on) a location 4 in the displayed environment map 9 in order to thereby set a marker within the environment map 9. Alternatively, the user can select an object 6 to be monitored, in this case the door leaf. After the respective selection of the location 4 or the object 6, the user selects a desired function on the external device 8, in this example the function "start monitoring mode." Subsequently, the surface treatment device 1 respectively travels from the base station 10 in the direction of the location 4 or in the direction of the object 6. This is illustrated in FIG. 4.

The surface treatment device 1 then reaches the range of motion. 5 of the object 6, namely the pivoting range of the door leaf. Due to the selected function "start monitoring mode," the surface treatment device 1 is positioned at a defined distance a (see FIG. 5) from the object 6 to be monitored. In this case, the positioning and the orientation of the surface treatment device 1 are controlled in such a way that the obstacle detection device 3, i.e. the contact sensor, points in the direction of the object 6 to be monitored.

In addition, the user of the surface treatment device 1 can define a time span, during which the monitoring function should be performed, by means of the external device 8. For example, a time span of an absence of the user, e.g. three hours, may be defined. Within this time span, the obstacle detection device 2 in the form of a laser triangulation measuring device measures the distance a between the surface treatment device 1 and the object 6 in defined time intervals, for example in respective time intervals of one minute. The evaluation and control unit of the surface treatment device 1 then calculates a difference between successively measured distance values. This can either be realized by using two directly successive measurements or by using two measurements, which are separated by other measurements. The difference is compared with a defined threshold value, which in this example amounts to 20 mm. This means that the measured values of the distance a are monitored to the effect whether they have a time rate of change in excess of 20 mm. If this is the case, a motion of the object 6, namely a pivoting motion of the door leaf within the range of motion 5, is detected and an alarm signal is triggered, wherein said alarm signal is output, for example, in the form of an acoustic signal by the surface treatment device 1 on the one hand and in the form of an optical signal on the display 7 of the external device 8 on the other hand such that a user can also notice the alarm when he is not present within the environment of the surface treatment device 1. The above-described measurement by means of the obstacle detection device 2 requires an unchanged position of the surface treatment device 1 at the defined location 4. During the measurement, the surface treatment device 1 therefore remains motionless, but active with respect to the obstacle detection device 2, such that a distance a to the object 6 can be continuously measured.

The obstacle detection device 3 in the form of a contact sensor can also be used for monitoring the object 6 as an alternative or in addition to the obstacle detection device 2. In this case, the surface treatment device 1 may switch into a standby mode after it reaches the defined location 4 and only be awakened in case of a collision of the object with the obstacle detection device 3, namely the associated section of the device housing 13. The surface treatment device 1 can be operated in a correspondingly energy-saving manner if a motion of the object 6 is only detected by means of the obstacle detection device 3.

If a burglary is attempted via the object 6, namely the monitored door, the object 6 is pivoted into the range of motion 5 and moves toward the location 4, at which the surface treatment device 1 is motionlessly positioned. The distance a measured by the obstacle detection device 2 initially changes due to this motion of the object 6. If applicable, the object 6 subsequently comes in contact with the obstacle detection device 3 and actuates the pushbutton arranged on the device housing 13. In both instances, the evaluation and control unit of the surface treatment device 1 detects a motion of the object 6, determines that an attempted burglary is in progress and triggers a corresponding alarm.

LIST OF REFERENCE SYMBOLS

1 Surface treatment device
2 Obstacle detection device
3 Obstacle detection device
4 Location
5 Range of motion
6 Object
7 Display
8 External device
9 Environment map
10 Base station
11 Brush
12 Wheel
13 Device housing
a Distance

The invention claimed is:

1. A method for operating an independently moving surface treatment device (1), wherein the surface treatment device (1) can travel in an environment and perform surface treatment tasks where necessary, and wherein an obstacle detection device (2, 3) of the surface treatment device (1) measures an obstacle within the environment, wherein the surface treatment device (1) remains motionless at a defined location (4) of the environment, (6), during a user-predefined time span, wherein the obstacle detection device (2, 3) repeatedly measures a distance (a) to a certain object (6) and evaluates the measured values of the distance (a) with respect to a time rate of change during the time span and/or wherein the obstacle detection device (2, 3) detects a potentially occurring collision with the object (6) during the time span, and wherein an alarm signal is output in case of a change beyond a defined threshold value and/or in case of a collision.

2. The method according to claim 1, wherein a user of the surface treatment device (1) selects the object (6) in an environment map (9) displayed on a display of the surface treatment device (1) and/or on a display (7) of an external device (8), which is communicatively linked to the surface treatment device (1).

3. The method according to claim 2, wherein the surface treatment device (1) is respectively moved to the defined location (4) or into a range of motion (5) of a certain object (6) in dependence on the previous selection by a control unit of the surface treatment device (1) and/or of the external device (8), and wherein the surface treatment device assumes a position and/or orientation, which allows an obstacle detection on the object (6).

4. The method according to claim 1, wherein a measured change of the distance (a) beyond the threshold value or a detected collision respectively implies a motion of the object (6) and results in the output of the alarm signal.

5. The method according to claim 1, wherein a collision is detected by a contact sensor, an acceleration sensor, a capacitive sensor and/or an odometric sensor.

6. The method according to claim 1, wherein the surface treatment device (1) switches into a standby mode after it reaches the defined location (4) and is awakened by a collision with the object (6).

7. The method according to claim 1, wherein the monitored object (6) is a movable window sash or a movable door leaf.

8. An independently moving surface treatment device (1), which can travel in an environment and perform surface treatment tasks where necessary, wherein the surface treatment device comprises an obstacle detection device (2, 3) for measuring an obstacle within the environment and a control unit, wherein the control unit is designed for positioning the surface treatment device (1) motionlessly at a defined location (4) of the environment, during a user-predefined time span, wherein the obstacle detection device (1) is designed for repeatedly measuring a distance (a) to a certain object (6) and evaluating the measured values of the distance (a) with respect to a time rate of change during the time span and/or for detecting a potentially occurring collision with the object (6) during the time span, as well as for outputting an alarm signal in case of a change beyond a defined threshold value and/or in case of a collision.

9. A set consisting of the independently moving surface treatment device (1) according to claim 8 and an external device (8), which is communicatively linked to the surface treatment device (1) and comprises a display (7) for displaying an environment map (9) of the surface treatment device (1), wherein the external device (8) is designed for allowing a selection of a defined location (4) within an environment map (9) displayed on the display (7) and for transmitting information on the selection to the surface treatment device (1), wherein the surface treatment device (1) is designed for moving to the defined location (4) in dependence on the selection and assuming an orientation, which allows a measurement on a certain object (6), as well as for remaining at the defined location (4) motionlessly during a user-predefined time span.

10. A computer program product embodied in a non-transitory computer-readable storage medium configured for being installed on an independently moving surface treatment device (1) and/or on an external device (8), which is communicatively linked to the surface treatment device (1), wherein the computer program product is designed for controlling the surface treatment device (1), wherein the computer program product comprises: a program step for displaying an environment map (9) of the surface treatment device (1) on a display of the surface treatment device (1) and/or on a display (7) of the external device (8), a program step for selecting a location (4) to be monitored within the environment map (9), a program step for moving the surface treatment device (1) to the selected location (4), particularly into a range of motion (5) of a certain object (6), a program step for motionlessly positioning the surface treatment device (1) at the location (4) during a defined time span, and a program step for controlling an obstacle detection device (2, 3) of the surface treatment device (1) to repeatedly measure a distance (a) to the certain object (6) and evaluate the measured distances (a) with respect to a time rate of change and/or to detect a potentially occurring collision with the object (6).

* * * * *